(12) United States Patent
Marupaduga et al.

(10) Patent No.: US 12,156,121 B1
(45) Date of Patent: Nov. 26, 2024

(54) PERFORMING MU-MIMO IN WIRELESS COMMUNICATION NETWORKS

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum LP, Overland Park, KS (US)

( * ) Notice: Subject to any disclaimer, the term of this patent is extended or adjusted under 35 U.S.C. 154(b) by 466 days.

(21) Appl. No.: 16/359,041

(22) Filed: Mar. 20, 2019

(51) Int. Cl.
| | |
|---|---|
| H04W 48/06 | (2009.01) |
| H04B 7/0452 | (2017.01) |
| H04B 17/336 | (2015.01) |
| H04L 1/00 | (2006.01) |
| H04L 43/16 | (2022.01) |
| H04W 24/08 | (2009.01) |
| H04W 28/08 | (2023.01) |

(52) U.S. Cl.
CPC .......... H04W 48/06 (2013.01); H04B 7/0452 (2013.01); H04B 17/336 (2015.01); H04L 1/0003 (2013.01); H04L 43/16 (2013.01); H04W 24/08 (2013.01); H04W 28/08 (2013.01)

(58) Field of Classification Search
CPC ..... H04W 48/06; H04W 24/08; H04W 28/08; H04B 17/336; H04B 7/0452; H04L 1/0003; H04L 43/16; H04L 25/03343
See application file for complete search history.

(56) References Cited

U.S. PATENT DOCUMENTS

| | | | |
|---|---|---|---|
| 8,254,328 B2 | 8/2012 | Yoshida et al. | |
| 9,698,889 B2 | 7/2017 | Xue et al. | |
| 2007/0223422 A1* | 9/2007 | Kim ..................... | H04B 7/0632 370/334 |
| 2007/0223423 A1* | 9/2007 | Kim ..................... | H04L 1/0026 370/334 |

(Continued)

FOREIGN PATENT DOCUMENTS

| | | | |
|---|---|---|---|
| CN | 102420645 B | * 12/2015 | |
| CN | 104170505 B | * 12/2017 | ........... H04B 7/0404 |

(Continued)

OTHER PUBLICATIONS

Li, Scheduling method, dispatching device and base station (EPO website translation of CN 104, 170,505 B), Dec. 22, 2017, SIPO, whole document (Year: 2017).*

(Continued)

Primary Examiner — Michael Thier
Assistant Examiner — Jose L Perez
(74) Attorney, Agent, or Firm — Jones Robb, PLLC

(57) ABSTRACT

Performing MU-MIMO in a wireless communication network based on determining that a load level of a sector deployed by an access node is below a load threshold, determining that one or more signal conditions within the sector meet a signal threshold, and disabling a MU-MIMO operating mode for wireless devices within the sector. The signal conditions can include current or historical signal conditions. An exemplary current signal condition includes an interference or other signal metric of the at least two wireless devices different by a threshold amount.

20 Claims, 4 Drawing Sheets

(56) References Cited

U.S. PATENT DOCUMENTS

| | | | |
|---|---|---|---|
| 2008/0025336 A1* | 1/2008 | Cho | H04W 72/542 |
| | | | 370/432 |
| 2009/0034639 A1* | 2/2009 | Hwang | H04B 7/0689 |
| | | | 375/260 |
| 2009/0268698 A1* | 10/2009 | Lee | H04B 7/0417 |
| | | | 370/336 |
| 2010/0091743 A1* | 4/2010 | Kazmi | H04B 7/0689 |
| | | | 370/336 |
| 2010/0135177 A1 | 6/2010 | Liu et al. | |
| 2010/0296591 A1* | 11/2010 | Xu | H04B 7/0413 |
| | | | 375/259 |
| 2011/0002411 A1* | 1/2011 | Forenza | H04L 25/03343 |
| | | | 375/267 |
| 2011/0200131 A1* | 8/2011 | Gao | H04B 7/0639 |
| | | | 375/267 |
| 2012/0008613 A1* | 1/2012 | Lee | H04B 7/0452 |
| | | | 370/338 |
| 2012/0134279 A1* | 5/2012 | Tamaki | H04B 7/0452 |
| | | | 370/248 |
| 2013/0128820 A1* | 5/2013 | Yuan | H04B 17/373 |
| | | | 370/329 |
| 2013/0343303 A1* | 12/2013 | Kim | H04B 7/0639 |
| | | | 370/329 |
| 2015/0049825 A1* | 2/2015 | Salonidis | H04B 7/0413 |
| | | | 375/267 |
| 2015/0245360 A1* | 8/2015 | Gao | H04L 1/00 |
| | | | 370/329 |
| 2015/0326340 A1* | 11/2015 | Huang | H04L 1/0026 |
| | | | 375/267 |
| 2016/0013842 A1* | 1/2016 | Huo | H04L 25/03343 |
| | | | 370/252 |
| 2016/0088648 A1* | 3/2016 | Xue | H04B 7/0452 |
| | | | 370/252 |
| 2016/0359661 A1* | 12/2016 | Chhabra | H04B 7/0413 |
| 2017/0064566 A1* | 3/2017 | Elsherif | H04W 16/28 |
| 2017/0222710 A1* | 8/2017 | Eitan | H04B 7/0413 |
| 2017/0331529 A1* | 11/2017 | Lee | H04B 7/0689 |
| 2017/0353283 A1* | 12/2017 | Hsu | H04B 7/0452 |
| 2018/0234141 A1* | 8/2018 | Silverman | H04B 7/0452 |
| 2018/0324629 A1* | 11/2018 | Zhu | H04B 7/0413 |
| 2018/0359006 A1* | 12/2018 | Liang | H04B 7/0691 |
| 2019/0140791 A1* | 5/2019 | Zhao | H04L 47/00 |
| 2020/0045627 A1* | 2/2020 | Wolfe | H04L 5/0092 |
| 2020/0228281 A1* | 7/2020 | Choi | H04B 7/04 |
| 2020/0343945 A1* | 10/2020 | Stephenne | H04W 72/54 |
| 2020/0373973 A1* | 11/2020 | Hessler | H04B 7/0452 |
| 2021/0344397 A1* | 11/2021 | Lee | H04B 7/02 |

FOREIGN PATENT DOCUMENTS

| | | | | |
|---|---|---|---|---|
| JP | 2009044415 A | * | 2/2009 | |
| WO | WO-2009062400 A1 | * | 5/2009 | H04B 7/0413 |
| WO | WO-2009092184 A1 | * | 7/2009 | H04W 52/346 |
| WO | WO-2014089824 A1 | * | 6/2014 | H04B 7/0404 |

OTHER PUBLICATIONS

Chang et al., Packet scheduling method of multi-user multiple-input multiple-output system and apparatus thereof (EPO website translation of CN 102,420,645 B), Dec. 16, 2015, SIPO, whole document (Year: 2015).*

Theeksha et al., Performance analysis and mode selection of SU-MIMO and MU-MIMO in 802.11ac, Jul. 25, 2013, 2013 International Conference on Recent Trends in Information Technology (ICRTIT), whole document (Year: 2013).*

Thapa et al., A MAC protocol to select optimal transmission mode in very high throughput WLAN: MU-MIMO vs. multiple SU-MIMO, Nov. 23, 2012, 2012 Third Asian Himalayas International Conference on Internet, whole document (Year: 2012).*

* cited by examiner

000
PERFORMING MU-MIMO IN WIRELESS COMMUNICATION NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. MIMO has been identified as one of the promising air interface technologies to address the capacity requirement required demanded by 5G networks. However, indiscriminately enabling wireless devices to participate in a MU-MIMO operating mode or transmission mode may compromise a quality of service for different wireless devices that may otherwise benefit from remaining in a SU-MIMO operating mode, or that may otherwise qualify for operating in the MU-MIMO mode but may otherwise not realize the gains from operating the MU-MIMO mode. Thus, there is a need to screen or limit wireless devices from participating in MU-MIMO.

OVERVIEW

Exemplary embodiments described herein include methods, systems, and processing nodes for performing MU-MIMO in wireless communication networks. An exemplary method for performing MU-MIMO in wireless communication networks includes monitoring a load level associated with an access node, wherein at least two wireless devices that qualify for participating in a first MU-MIMO group are attached to the access node, determining that the load level is below a first load threshold, and preventing the at least two wireless devices from participating in the first MU-MIMO group.

Another exemplary method for performing MU-MIMO in wireless communication networks includes determining that a load level of a sector deployed by an access node is below a first load threshold, determining that one or more signal conditions within the sector meet a signal threshold, and responsive to determining that the load level is below the first load threshold and the signal conditions meeting the signal threshold, disabling a MU-MIMO operating mode for wireless devices within the sector.

An exemplary system for performing MU-MIMO in wireless communication networks includes a processing node, and a processor coupled to the processing node. The processor can be configured to perform operations including determining that two or more wireless devices within a sector deployed by an access node qualify for participating in a MU-MIMO group, determining that one or more signal conditions within the sector meet a signal threshold, and responsive to determining that the one or more signal conditions meet the signal threshold, preventing the two or more wireless devices from participating in the MU-MIMO group.

DETAILED DESCRIPTION

Figure 1:
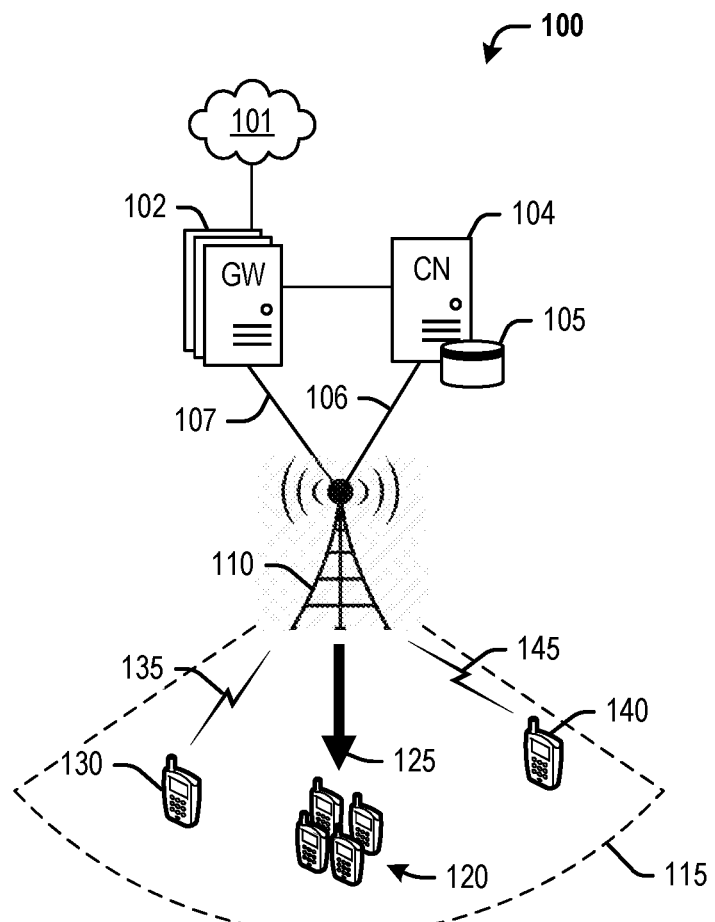
FIG. 1 depicts an exemplary system for performing MU-MIMO in wireless communication networks.

In embodiments disclosed herein, a method for performing multi-user multiple-input multiple-output (MU-MIMO) in a wireless communication network includes monitoring a load level associated with an access node, wherein at least two wireless devices that qualify for participating in a first MU-MIMO group are attached to the access node, determining that the load level is below a first load threshold, and preventing the at least two wireless devices from participating in the first MU-MIMO group. Wireless devices that are prevented from joining MU-MIMO groups can take advantage of single user (SU) MIMO. Moreover, the access node may be instructed to remove one or more additional wireless devices from existing MU-MIMO groups. This instruction may be responsive to determining that the load level is below the first threshold, or upon determining that the load level is below a second load threshold that is less than the first load threshold. Further, the load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector.

Preventing the at least two wireless devices from participating in the first MU-MIMO group may include disabling a MU-MIMO operating mode of the at least two wireless devices. Further, preventing the at least two wireless devices from participating in the first MU-MIMO group can include instructing the access node to prevent new MU-MIMO groups from being formed. In an exemplary embodiment, the access node may be instructed to reduce a maximum permissible number of MU-MIMO groups associated with the access node responsive to determining that the load level is below the first (or any other) load threshold. Conversely, it may be determined that the load level meets or exceeds the first load threshold, upon which the access node is instructed to increase the maximum permissible number of MU-MIMO groups associated with the access node. Further, additional qualifying wireless devices may be instructed to form MU-MIMO groups responsive to determining that the load level meets or exceeds the threshold, so as to improve efficiency of the resource allocation associated with the access node.

In a further exemplary embodiment, upon determining that the load level meets the first load threshold, rather than increasing or enabling MU-MIMO as described above, it may be determined that one or more signal thresholds are met as a condition to preventing the at least two wireless devices from participating in the first MU-MIMO group. In other words, even if the load level is high enough to meet the threshold, MU-MIMO operations may be disabled given certain signal conditions meeting a threshold. For example, the signal conditions may be based on historical signal condition information associated with the access node, such as a historical interference (e.g. signal-to-interference-plus-noise ratio (SINR)), a historical throughput, or a historical MU-MIMO gain. Upon determining that a historical interference level is above a threshold, or a historical throughput or MU-MIMO gain is below a threshold, the MU-MIMO operating mode may be disabled, and/or group number and size reduced as described above. These signal conditions and thresholds thereof may be associated with a sector deployed by the access node, with the at least two wireless devices being located within the sector. Since an exemplary access node as described herein comprises a plurality of antennae (or an antenna array) configured to deploy a radio air interface over one or more sectors, the aforementioned load levels and signal conditions may be determined for each sector separately or in combination. Further, if it is determined that these historical signal conditions are not met, then the at least two wireless devices may be allowed to participate in the MU-MIMO group, and/or the access node may be instructed to increase a number and/or size of MU-MIMO groups.

Further, the one or more signal thresholds may be based on current signal condition information. For example, the current signal condition information can include a current interference level (e.g. SINR), a current modulation and coding scheme (MCS), a current latency, or any other current signal condition associated with the two or more wireless devices, or the sector of the access node. In an exemplary embodiment, it may be determined that a first current signal condition of a first wireless device from among the two or more wireless devices differs from a second current signal condition of a second wireless device from among the two or more wireless devices by a threshold. In other words, it is determined that two qualifying wireless devices are experiencing different signal conditions, responsive to which the two qualifying wireless devices are prevented from participating in the first MU-MIMO group. This is because the two wireless devices may experience different levels of quality of a downlink MU-MIMO stream, despite otherwise qualifying to participate (by virtue of their orthogonality, etc.). Conversely, if the signal conditions of each wireless device differ by less than the threshold, the MU-MIMO mode may be enabled, or the access node may be instructed to add the wireless devices to existing MU-MIMO groups and/or form new MU-MIMO groups.

In another exemplary embodiment, a method for performing MU-MIMO includes determining that a load level of a sector deployed by an access node is below a first load threshold, determining that one or more signal conditions within the sector meet a signal threshold and, responsive to determining that the load level is below the first load threshold and the signal conditions meeting the signal threshold, disabling a MU-MIMO operating mode for wireless devices within the sector. As described herein, disabling the MU-MIMO operating mode for wireless devices within the sector comprises preventing the access node from forming new MU-MIMO groups within the sector. Alternatively or in addition, disabling the MU-MIMO operating mode for wireless devices within the sector includes preventing the wireless devices within the sector from joining existing MU-MIMO groups. Further, it may be determined that the load level meets or exceeds the first load threshold, and continuing to disable the MU-MIMO operating mode responsive to determining that the signal conditions continue to meet the signal threshold. Responsive to determining that the load level meets or exceeds the first load threshold and that the signal conditions do not meet the signal threshold, the MU-MIMO operating mode may be enabled as described above. In this and related exemplary embodiments, the signal conditions comprise one or more of historical signal conditions and current signal conditions. Further, the load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector.

In another exemplary embodiment, a system for mitigating interference in a wireless communication network, includes at least a processing node and a processor coupled to the processing node. The processor can be configured to determine that two or more wireless devices within a sector deployed by an access node qualify for participating in a MU-MIMO group, determine that one or more signal conditions within the sector meet a signal threshold and, responsive to determining that the one or more signal conditions meet the signal threshold, prevent the two or more wireless devices from participating in the MU-MIMO group. Determining that two or more wireless devices qualify for participating in the MU-MIMO group can be based on a load level of the sector meeting a load threshold. The system may further be configured to perform the operations described above with respect to the method. For example, the processing node may be configured to perform operations including monitoring a load level associated with an access node, wherein at least two wireless devices that qualify for participating in a first MU-MIMO group are attached to the access node, determining that the load level is below a first load threshold, and preventing the at least two wireless devices from participating in the first MU-MIMO group. Wireless devices that are prevented from joining MU-MIMO groups can take advantage of single user (SU) MIMO. Moreover, the access node may be instructed to remove one or more additional wireless devices from existing MU-MIMO groups. This instruction may be responsive to determining that the load level is below the first threshold, or upon determining that the load level is below a second load threshold that is less than the first load threshold. Further, these operations may be performed within a time period. The time period can be configurable, in that it can be adjusted by an operator of the wireless network, or by an automated feedback mechanism. For example, time intervals may be defined by the operator as every transmission-time-interval (TTI), every 10 ms, every 1 s, etc. Further, the time period may be dynamically adjusted based on the determined load level. If the load level continues to meet or exceed the threshold, the time period is decreased and, if the load level remains below the threshold, the time period is decreased. These and additional operations are further described with respect to the embodiments depicted in FIGS. 1-4 below.

FIG. 1 depicts an exemplary system 100 for performing MU-MIMO in a wireless network. System 100 comprises a communication network 101, gateway node(s) 102, controller node 104, access node 110, and wireless devices 120, 130, 140. Access node 110 is illustrated as deploying a sector 115, with wireless devices 120, 130, 140 being located within sector 115 and accessing network services from access node 110. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can implement various transmission modes or operating modes within sector 115, including multiple-input-multiple-output (MIMO), single user MIMO (SU-MIMO), multi-user MIMO (MU-MIMO), beamforming, etc. In an exemplary embodiment, access node 110 may utilize a first plurality of antennae to transmit a MU-MIMO data stream 125 to a corresponding plurality of wireless devices 120, a second plurality of antennae to transmit a single-user data stream (SU-MIMO) 135 to wireless device 130, and another standard or SU-MIMO data stream 145 to wireless device 140. Moreover, it is noted that while access node 110 is illustrated in FIG. 1, any number of access nodes can be implemented within system 100.

In operation, access node 110 (or any other entity within system 100) may be configured to execute a method for performing MU-MIMO in system 100 by monitoring a load level associated with sector 115 and preventing or limiting MU-MIMO operation of wireless devices 120, 130, 140 based thereon. For example, as described above, wireless devices 120 may be participating in a MU-MIMO group, while wireless devices 130 and 140 may qualify for participating in either MU-MIMO group 120 or forming a new MU-MIMO group. Wireless devices 130, 140 may qualify for MU-MIMO based on, for instance, an orthogonality of transmission, so as to maximize resources of a loaded access node. In other words, one or more criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130, 140 based on channel feedback received from said wireless devices including RI, CQI, and PMI. CRS' are not pre-coded signals and are used by wireless devices 120, 130, 140 for channel estimation. To fully exploit MU-MIMO mode, data/spatial streams intended to/from access node 110 and/or wireless devices 120, 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference. To avoid scheduling wireless devices 120, 130, 140 located at, for example, a cell-edge of access node 110, into MU-MIMO mode, a predicted SINR of both the primary and candidate wireless devices at the considered PRB are compared to the set threshold.

Further, responsive to determining that the load level is below a load threshold, access node 110 (or a processing node coupled thereto) may be configured to prevent wireless devices 130, 140 from participating in a MU-MIMO operating mode, since there are ample resources for wireless devices 130, 140 to continue participating in a standard or SU-MIMO operating mode. Moreover, the access node 110 may be instructed to remove one or more additional wireless devices from existing MU-MIMO group 120. Removal of wireless devices from MU-MIMO group 120 may be performed responsive to determining that the load level is below the same threshold used in the previous step, or upon determining that the load level is below a second load threshold that is less than the first load threshold. In an exemplary embodiment, the load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector.

Preventing wireless devices 130, 140 from participating in MU-MIMO group 120 may include disabling a MU-MIMO operating mode of wireless devices 130, 140. Further, preventing wireless devices 130, 140 from participating in the MU-MIMO operating mode can include instructing the access node 110 to prevent new MU-MIMO groups from being formed. In an exemplary embodiment, the access node 110 may be instructed to reduce a maximum permissible number of MU-MIMO groups associated with the access node 110 or within sector 115 responsive to determining that the load level is below the first (or any other) load threshold. Conversely, it may be determined that the load level meets or exceeds the first load threshold, upon which the access node 110 is instructed to increase the maximum permissible number of MU-MIMO groups associated with the access node 110 or within sector 115. Further, additional qualifying wireless devices (e.g. wireless devices 130, 140) may be instructed to form MU-MIMO groups responsive to determining that the load level meets or exceeds the threshold, so as to improve efficiency of the resource allocation associated with the access node 110.

In a further exemplary embodiment, upon determining that the load level meets the first load threshold, rather than increasing or enabling MU-MIMO as described above, it may be determined that one or more signal thresholds are met as a condition to preventing wireless devices 130, 140 from participating in the MU-MIMO operating mode (whether by joining the MU-MIMO group 120 or forming a new MU-MIMO group). In other words, even if the load level is high enough to meet the threshold, MU-MIMO operations may be disabled given certain signal conditions meeting a threshold. For example, the signal conditions may be based on historical signal condition information associated with the access node 110 or sector 115, such as a historical interference (e.g. signal-to-interference-plus-noise ratio (SINR)), a historical throughput, or a historical MU-MIMO gain. Upon determining that a historical interference level is above a threshold, or a historical throughput or MU-MIMO gain is below a threshold, the MU-MIMO operating mode may be disabled, and/or group number and size reduced as described above. Further, if it is determined that these historical signal conditions are not met, then wireless devices 130, 140 may be allowed to participate in the MU-MIMO group, and/or the access node 110 may be instructed to increase a number and/or size of MU-MIMO groups such as MU-MIMO group 120.

Further, the one or more signal thresholds may be based on current signal condition information. For example, the current signal condition information can include a current interference level (e.g. SINR), a current modulation and coding scheme (MCS), a current latency, or any other current signal condition associated with wireless devices 130, 140, or sector 115. In an exemplary embodiment, it may be determined that a current signal condition of wireless device 130 (e.g. a signal condition of transmission link 135) differs from a second current signal condition of wireless device 140 (e.g. a signal condition of transmission link 145) by a threshold. In other words, it is determined that wireless devices 130 and 140 are experiencing different signal conditions from each other. Upon determining this difference meeting or exceeding a threshold, wireless devices 130, 140 are prevented from participating in the MU-MIMO operating mode. This is because the two wireless devices 130, 140 may experience different levels of quality of a downlink MU-MIMO stream, despite otherwise qualifying to participate (by virtue of their orthogonality, SINR, etc.). Conversely, if the signal conditions of each wireless device 130, 140 differ by less than the threshold, the MU-MIMO mode may be enabled, or the access node 110 may be instructed to add the wireless devices 130, 140 to existing MU-MIMO groups and/or form new MU-MIMO groups.

In another exemplary embodiment, access node 110 (and/or a processing node coupled thereto) may be configured to perform a method that includes determining that a load level of sector 115 (or of all sectors deployed by access node 110) is below a first load threshold, determining that one or more signal conditions within the sector 115 meet a signal threshold and, responsive to determining that the load level is below the first load threshold and the signal conditions meeting the signal threshold, disabling a MU-MIMO operating mode for wireless devices 120, 130, 140 within the sector 115. As described herein, disabling the MU-MIMO operating mode for wireless devices 120, 130, 140 within the sector comprises preventing the access node 110 from forming new MU-MIMO groups within the sector 115. Alternatively or in addition, disabling the MU-MIMO operating mode for wireless devices 120, 130, 140 within the sector includes preventing the wireless devices 130, 140 from joining existing MU-MIMO groups such as MU-MIMO group 120. Further, it may be determined that the load level meets or exceeds the first load threshold, and continuing to disable the MU-MIMO operating mode responsive to determining that the signal conditions continue to meet the signal threshold. Responsive to determining that the load level meets or exceeds the first load threshold and that the signal conditions do not meet the signal threshold, the MU-MIMO operating mode may be enabled as described above. In this and related exemplary embodiments, the signal conditions comprise one or more of historical signal conditions and current signal conditions. Further, the load level of access node 110 (or sector 115) may be based on a throughput, or any metric that indicating an availability of resources in the sector 115. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector 115.

In another exemplary embodiment, a processor coupled to a processing node within system 100 can be configured to determine that two or more wireless devices (e.g. wireless devices 130, 140) within sector 115 deployed by access node 110 qualify for participating in a MU-MIMO group, determine that one or more signal conditions within the sector 115 meet a signal threshold and, responsive to determining that the one or more signal conditions meet the signal threshold, prevent the two or more wireless devices 130, 140 from participating in the MU-MIMO group. Determining that wireless devices 130, 140 qualify for participating in the MU-MIMO group can be based in part on a load level of the sector 115 meeting a load threshold. The processor may further be configured to perform the operations described above with respect to the method. For example, the processor may be configured to perform operations including monitoring a load level associated with access node 110, wherein at least two wireless devices 130, 140 that qualify for participating in the MU-MIMO operating mode are attached to access node 110, determining that the load level is below a first load threshold, and preventing the wireless devices 130, 140 from participating in the MU-MIMO operating mode. Wireless devices 130, 140 can therefore take advantage of single user (SU) MIMO or other standard transmission modes. Moreover, the access node 110 may be instructed to remove one or more additional wireless devices from existing MU-MIMO group 120. This instruction may be responsive to determining that the load level is below the first threshold, or upon determining that the load level is below a second load threshold that is less than the first load threshold.

Further, the above operations may be performed within a time period. The time period can be configurable, in that it can be adjusted by an operator of system 100, or by an automated feedback mechanism. For example, time intervals may be defined by the operator as every transmission-time-interval (TTI), every 10 ms, every 1 s, etc. Alternatively or in addition, the time period may be dynamically adjusted based on the determined load level. If the load level continues to meet or exceed the threshold, the time period is decreased and, if the load level remains below the threshold, the time period is decreased.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to capabilities of wireless devices 120, 130, 140, including MU-MIMO capabilities, real-time and/or historic information related to load and/or throughput of access node 110 and/or sector 115, historic signal conditions related to sector 115 and wireless devices therein, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
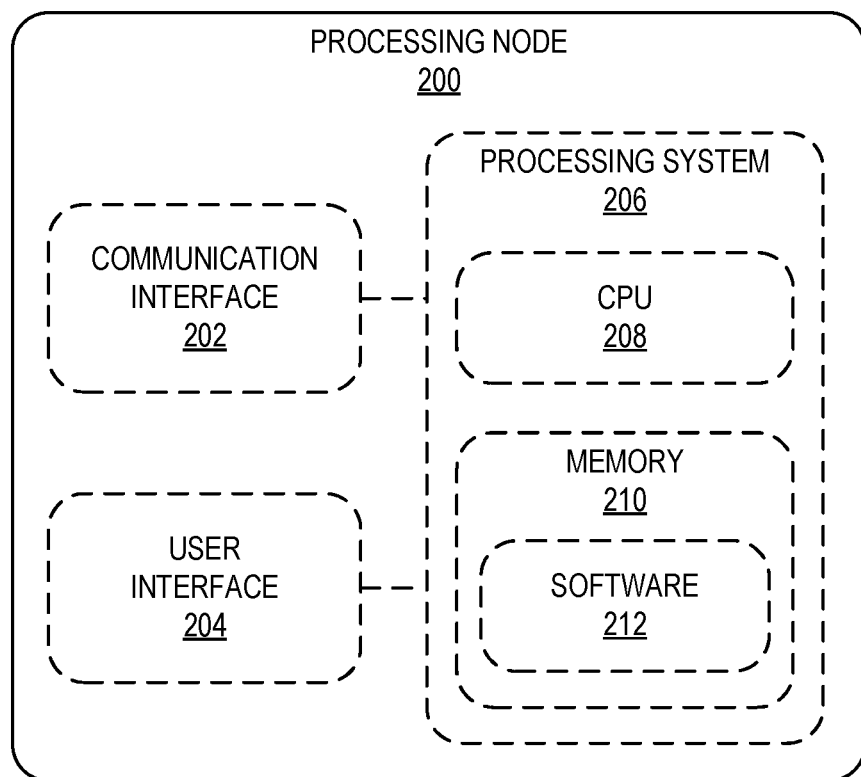
FIG. 2 depicts an exemplary processing node for performing MU-MIMO in wireless communication networks.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the MU-MIMO operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
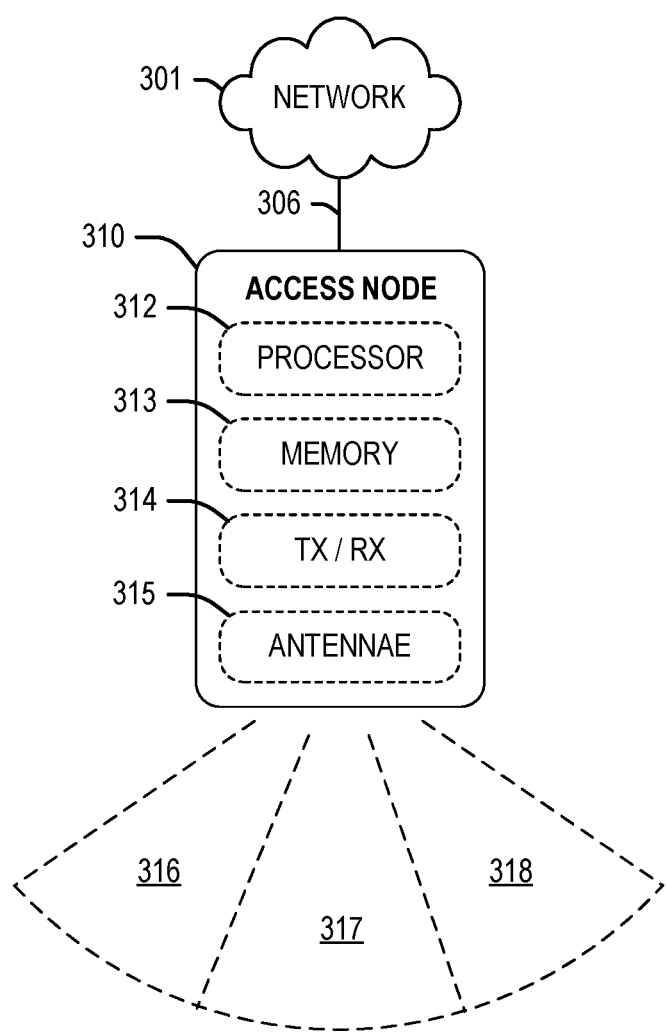
FIG. 3 depicts an exemplary access node for performing MU-MIMO in wireless communication networks.

FIG. 3 depicts an exemplary access node 310 for performing MU-MIMO in a wireless network. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors 316, 317, 318. Further, in each sector, the antennae 315 may be configured to operate in various operating modes (or transmit data in various transmission mode), such as SU-MIMO, MU-MIMO, beamforming, etc. Similarly, transceivers 314 include a plurality of transceivers that can deploy MU-MIMO or massive MIMO data streams to end-user wireless devices in sectors 316, 317, 318, as well as to facilitate communication with other network nodes on network 301. Further, access node 310 is communicatively coupled to network 301 via communication interface 306, which may be any wired or wireless link as described above.

In operation, memory 313 comprises one or more logical modules that are executed by processor 312 to enable access node 310 to perform MU-MIMO in a wireless communication network by monitoring a load level associated with access node 310, wherein at least two wireless devices that qualify for participating in a first MU-MIMO group are attached to the access node 310, determining that the load level is below a first load threshold, and preventing the at least two wireless devices from participating in the first MU-MIMO group. Wireless devices that are prevented from joining MU-MIMO groups can take advantage of single user (SU) MIMO. Moreover, the access node 310 may be instructed to remove one or more additional wireless devices from existing MU-MIMO groups. This instruction may be responsive to determining that the load level is below the first threshold, or upon determining that the load level is below a second load threshold that is less than the first load threshold. Further, the load level of access node 310 (or of sectors 316, 317, 318, whether collectively or individually) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within sectors 316, 317, 318.

Preventing the at least two wireless devices from participating in the first MU-MIMO group may include disabling a MU-MIMO operating mode of the at least two wireless devices. Further, preventing the at least two wireless devices from participating in the first MU-MIMO group can include instructing the access node 310 to prevent new MU-MIMO groups from being formed. In an exemplary embodiment, the access node 310 may be instructed to reduce a maximum permissible number of MU-MIMO groups associated with the access node 310 responsive to determining that the load level is below the first (or any other) load threshold. Conversely, it may be determined that the load level meets or exceeds the first load threshold, upon which the access node 310 is instructed to increase the maximum permissible number of MU-MIMO groups associated with the access node 310. Further, additional qualifying wireless devices may be instructed to form MU-MIMO groups responsive to determining that the load level meets or exceeds the threshold, so as to improve efficiency of the resource allocation associated with the access node.

In a further exemplary embodiment, upon determining that the load level meets the first load threshold, rather than increasing or enabling MU-MIMO as described above, it may be determined that one or more signal thresholds are met as a condition to preventing the at least two wireless devices from participating in the first MU-MIMO group. In other words, even if the load level is high enough to meet the threshold, MU-MIMO operations may be disabled given certain signal conditions meeting a threshold. For example, the signal conditions may be based on historical signal condition information associated with the access node 310, such as a historical interference (e.g. signal-to-interference-plus-noise ratio (SINR)), a historical throughput, or a historical MU-MIMO gain. Upon determining that a historical interference level is above a threshold, or a historical throughput or MU-MIMO gain is below a threshold, the MU-MIMO operating mode may be disabled, and/or group number and size reduced as described above. These signal conditions and thresholds thereof may be associated with one or more of sectors 316, 317, 318, with the at least two wireless devices being located within said one or more sectors. The load levels and signal conditions may be determined for each sector 316, 317, 318 separately or in combination. Further, if it is determined that these historical signal conditions are not met, then the at least two wireless devices may be allowed to participate in the MU-MIMO group, and/or the access node 310 may be instructed to increase a number and/or size of MU-MIMO groups.

Further, the one or more signal thresholds may be based on current signal condition information. For example, the current signal condition information can include a current interference level (e.g. SINR), a current modulation and coding scheme (MCS), a current latency, or any other current signal condition associated with the two or more wireless devices, access node 310, or sectors 316, 317, 318. In an exemplary embodiment, it may be determined that a first current signal condition of a first wireless device from among the two or more wireless devices differs from a second current signal condition of a second wireless device from among the two or more wireless devices by a threshold. In other words, it is determined that two qualifying wireless devices are experiencing different signal conditions, responsive to which the two qualifying wireless devices are prevented from participating in the first MU-MIMO group. This is because the two wireless devices may experience different levels of quality of a downlink MU-MIMO stream, despite otherwise qualifying to participate (by virtue of their orthogonality, etc.). Conversely, if the signal conditions of each wireless device differ by less than the threshold, the MU-MIMO mode may be enabled, or the access node 310 may be instructed to add the wireless devices to existing MU-MIMO groups and/or form new MU-MIMO groups.

In another exemplary embodiment, memory 313 may include instructions for performing MU-MIMO by determining that a load level of access node 310 (or one or more of sectors 316, 317, 318) is below a first load threshold, determining that one or more signal conditions meet a signal threshold and, responsive to determining that the load level is below the first load threshold and the signal conditions meeting the signal threshold, disabling a MU-MIMO operating mode for wireless devices within one of sectors 316, 317, 318. As described herein, disabling the MU-MIMO operating mode for wireless devices within sectors 316, 317, 318 comprises preventing the access node 310 from forming new MU-MIMO groups within the sector 316, 317, 318. Alternatively or in addition, disabling the MU-MIMO operating mode for wireless devices within sectors 316, 317, 318 includes preventing the wireless devices within the sector from joining existing MU-MIMO groups. Further, it may be determined that although the load level meets or exceeds the first load threshold, the MU-MIMO operating mode is continued to be disabled responsive to determining that the signal conditions continue to meet the signal threshold. Responsive to determining that the load level meets or exceeds the first load threshold and that the signal conditions do not meet the signal threshold, the MU-MIMO operating mode may be enabled as described above. In this and related exemplary embodiments, the signal conditions comprise one or more of historical signal conditions and current signal conditions. Further, the load level of access node 310 (or sectors 316, 317, 318) may be based on a throughput, or any metric that indicating an availability of resources in each sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within one or more of sectors 316, 317, 318.

In another exemplary embodiment, access node 310 may be part of a system for mitigating interference in a wireless communication network, the system including at least a processing node and a processor coupled to the processing node. The processor can be configured to determine that two or more wireless devices within a sector from among sectors 316, 317, 318 qualify for participating in a MU-MIMO group, determine that one or more signal conditions within the sector meet a signal threshold and, responsive to determining that the one or more signal conditions meet the signal threshold, prevent the two or more wireless devices from participating in the MU-MIMO group. Determining that two or more wireless devices qualify for participating in the MU-MIMO group can be based on a load level of the sector 316, 317, 318 meeting a load threshold. The system may further be configured to perform the operations described above with respect to the method.

Figure 4:
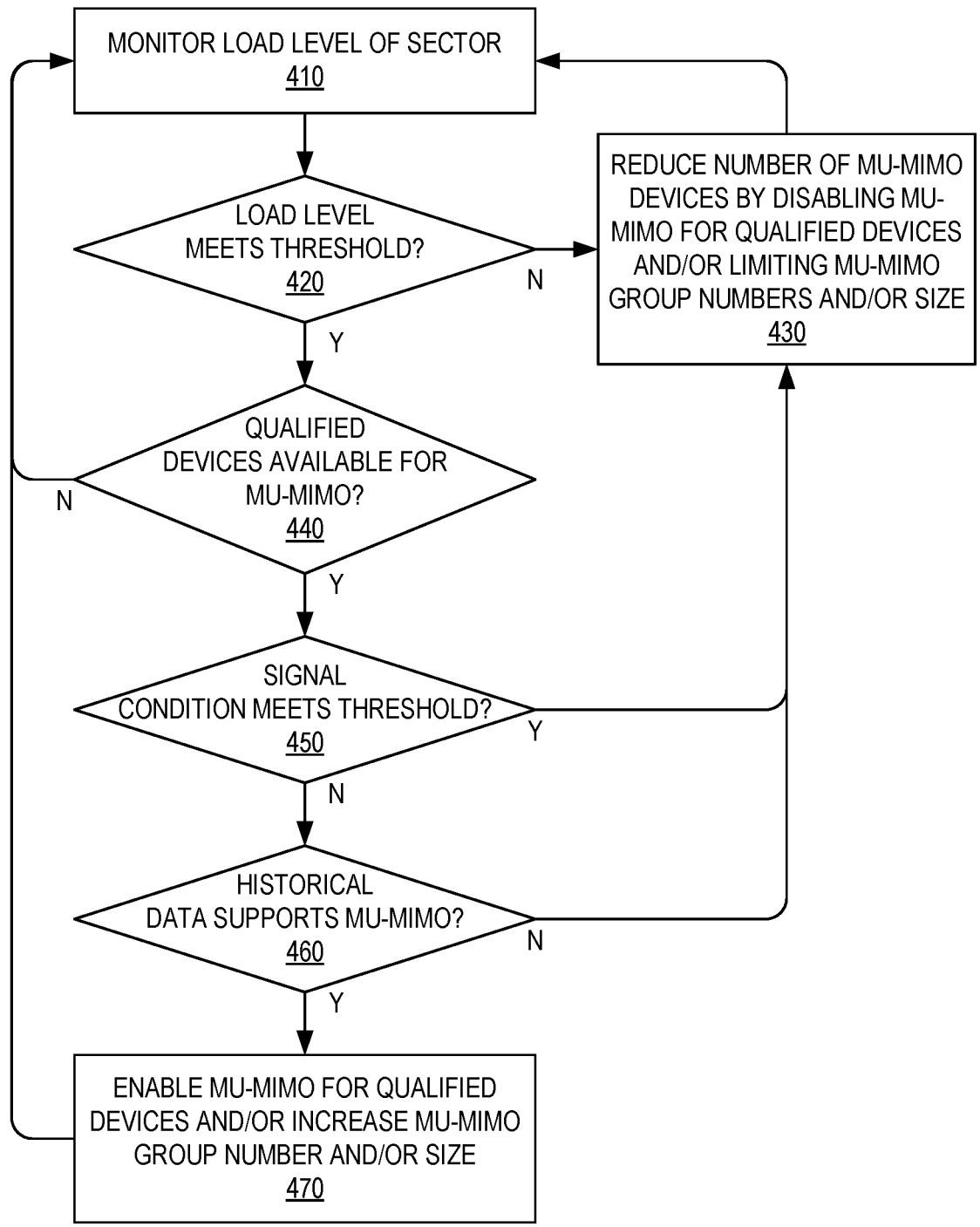
FIG. 4 depicts an exemplary method for performing MU-MIMO in wireless communication networks.

FIG. 4 depicts an exemplary method for performing MU-MIMO in a wireless communication network. The method of FIG. 4 is illustrated with respect to an access node, such as access node 110, 310. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a load level of an access node (or one or more sectors deployed therefrom) is monitored, and at 420, the load level is compared with a threshold. The load level may be based on a throughput, resource consumption, or any metric that indicating an availability of resources in the sector. For example, the throughput may be based on a total throughput indicator, an available throughput indicator, a resource usage, average bandwidth consumption, or any other key performance indicator (KPI). The load level may be compared with one or more thresholds for different purposes, such as a first threshold for limiting new MU-MIMO groups from being formed, and a second threshold for reducing the size and/or number of existing MU-MIMO groups.

If the access node is loaded at 420, then at 440 the MU-MIMO operating mode limited by reducing a number of MU-MIMO devices or reducing a size and/or number of MU-MIMO groups. For example, preventing the at least two wireless devices from participating in the first MU-MIMO group may include disabling a MU-MIMO operating mode of the at least two wireless devices. Further, preventing the at least two wireless devices from participating in the first MU-MIMO group can include instructing the access node to prevent new MU-MIMO groups from being formed. In an exemplary embodiment, the access node may be instructed to reduce a maximum permissible number of MU-MIMO groups associated with the access node responsive to determining that the load level is below the first (or any other) load threshold at 420.

If the access node (or sectors thereof) is loaded at 420, then at 430, it is determined whether or not any additional wireless devices exist within the sector that are qualified to participate in a MU-MIMO operating mode. Generally, criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of the access node may be supported at a physical layer by a set of downlink reference signals. These reference signals can be specific to wireless devices, i.e., DM-RS, or specific to geographical areas of the access node and/or sectors deployed therefrom, i.e., Common Reference Signals ("CRS"). DM-RS' are pre-coded signals used for demodulation purposes on scheduled PRBs. For example, a pre-coding module of an access node may apply pre-coding to data transmissions targeted to wireless devices attached thereto based on channel feedback received from said wireless devices including RI, CQI, and PMI. CRS' are not pre-coded signals and are used by the wireless devices for channel estimation. To fully exploit MU-MIMO mode, data/spatial streams intended to/from the access node and/or wireless devices need to be well separated and orthogonal at both Tx/Rx sides. Optimal pre-coding for MU-MIMO mode at, for example, a pre-coding module of the access node, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference. To avoid scheduling wireless devices located at, for example, a cell-edge of access node 110, into MU-MIMO mode, a predicted SINR of both the primary and candidate wireless devices at the considered PRB are compared to the set threshold Thus, if it is determined at 440 that qualified wireless devices exist, then at 450, it is determined whether or not a signal condition meets a threshold. For example, it may be determined that one or more signal thresholds are met as a condition to preventing the at least two wireless devices from participating in the first MU-MIMO group (as performed at 430). In other words, even if the load level is high enough at 420 to meet the threshold, MU-MIMO operations may be disabled given certain signal conditions meeting a threshold at 450, or if historical signal data does not support MU-MIMO operations at 460. For example, the signal conditions may be based on historical signal condition information associated with the access node, such as a historical interference (e.g. signal-to-interference-plus-noise ratio (SINR)), a historical throughput, or a historical MU-MIMO gain. Upon determining that a historical interference level is above a threshold, or a historical throughput or MU-MIMO gain is below a threshold, the MU-MIMO operating mode may be disabled, and/or group number and size reduced as described above. These signal conditions and thresholds thereof may be associated with a sector deployed by the access node, with the at least two wireless devices being located within the sector. Since an exemplary access node as described herein comprises a plurality of antennae (or an antenna array) configured to deploy a radio air interface over one or more sectors, the aforementioned load levels and signal conditions may be determined for each sector separately or in combination. Further, if it is determined that these historical signal conditions are not met, then the at least two wireless devices may be allowed to participate in the MU-MIMO group at 470, and/or the access node may be instructed to increase a number and/or size of MU-MIMO groups at 470.

Further at 450, the one or more signal thresholds may be based on current signal condition information. For example, the current signal condition information can include a current interference level (e.g. SINR), a current modulation and coding scheme (MCS), a current latency, or any other current signal condition associated with the two or more wireless devices, or the sector of the access node. In an exemplary embodiment, it may be determined that a first current signal condition of a first wireless device from among the two or more wireless devices differs from a second current signal condition of a second wireless device from among the two or more wireless devices by a threshold. In other words, it is determined that two qualifying wireless devices are experiencing different signal conditions, responsive to which the two qualifying wireless devices are prevented from participating in the first MU-MIMO group. This is because the two wireless devices may experience different levels of quality of a downlink MU-MIMO stream, despite otherwise qualifying to participate (by virtue of their orthogonality, etc.). Conversely, if the signal conditions of each wireless device differ by less than the threshold, then at 470, the MU-MIMO mode may be enabled, or the access node may be instructed to add the wireless devices to existing MU-MIMO groups and/or form new MU-MIMO groups.

Further, these operations may not necessarily be performed in the sequence presented in FIG. 4. For example, in a related embodiment, a method for performing MU-MIMO includes determining that a load level of a sector deployed by an access node is below a first load threshold, determining that one or more signal conditions within the sector meet a signal threshold and, responsive to determining that the load level is below the first load threshold and the signal conditions meeting the signal threshold, disabling a MU-MIMO operating mode for wireless devices within the sector. As described herein, disabling the MU-MIMO operating mode for wireless devices within the sector comprises preventing the access node from forming new MU-MIMO groups within the sector. Alternatively or in addition, disabling the MU-MIMO operating mode for wireless devices within the sector includes preventing the wireless devices within the sector from joining existing MU-MIMO groups. Further, it may be determined that the load level meets or exceeds the first load threshold, and continuing to disable the MU-MIMO operating mode responsive to determining that the signal conditions continue to meet the signal threshold. Responsive to determining that the load level meets or exceeds the first load threshold and that the signal conditions do not meet the signal threshold, the MU-MIMO operating mode may be enabled as described above. In this and related exemplary embodiments, the signal conditions comprise one or more of historical signal conditions and current signal conditions. Further, the load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector.

In a related exemplary embodiment, the method can include determining that two or more wireless devices within a sector deployed by an access node qualify for participating in a MU-MIMO group, determining that one or more signal conditions within the sector meet a signal threshold and, responsive to determining that the one or more signal conditions meet the signal threshold, preventing the two or more wireless devices from participating in the MU-MIMO group. Determining that two or more wireless devices qualify for participating in the MU-MIMO group can be based on a load level of the sector meeting a load threshold.

Further, the operations of FIG. 4 and the related embodiments may be performed within a time period. The time period can be configurable, in that it can be adjusted by an operator of the wireless network, or by an automated feedback mechanism. For example, time intervals may be defined by the operator as every transmission-time-interval (TTI), every 10 ms, every 1 s, etc. Further, the time period may be dynamically adjusted based on the determined load level. If the load level continues to meet or exceed the threshold, the time period is decreased and, if the load level remains below the threshold, the time period is decreased.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for preventing multi-user multiple-input multiple-output (MU-MIMO) in a wireless communication network, the method comprising:
monitoring a throughput of a geographic sector deployed by an access node that deploys multiple geographic sectors, wherein the geographic sector comprises at least two wireless devices located within the geographic sector that qualify for participating in a first MU-MIMO group and are attached to the access node; and
responsive to determining that the throughput of the geographic sector is below a first predetermined throughput threshold based on historical throughput of the geographic sector, preventing the at least two wireless devices located within the geographic sector among the deployed multiple geographic sectors from participating in the first MU-MIMO group.

2. The method of claim 1, further comprising:
determining that the throughput of the geographic sector is below a second predetermined throughput threshold, wherein the second predetermined throughput threshold is less than the first predetermined throughput threshold; and
instructing the access node to remove one or more additional wireless devices from the first MU-MIMO group of the geographic sector.

3. The method of claim 1, wherein preventing the at least two wireless devices located within the geographic sector from participating in the first MU-MIMO group comprises disabling a MU-MIMO operating mode of the at least two wireless devices located within the geographic sector.

4. The method of claim 1, wherein preventing the at least two wireless devices located within the geographic sector from participating in the first MU-MIMO group comprises instructing the access node to prevent new MU-MIMO groups from being formed.

5. The method of claim 1, further comprising reducing a maximum permissible number of MU-MIMO groups associated with the access node responsive to determining that the throughput of the at least two wireless devices located within the geographic sector is below the first predetermined throughput threshold.

6. The method of claim 5, further comprising:
subsequently determining that the throughput of the at least two wireless devices located within the geographic sector meets the first predetermined throughput threshold; and
increasing the maximum permissible number of MU-MIMO groups associated with the access node.

7. The method of claim 1, further comprising:
subsequently determining that the throughput of the at least two wireless devices located within the geographic sector meets the first predetermined throughput threshold; and
determining that one or more signal thresholds are met prior to preventing the at least two wireless devices located within the geographic sector from participating in the first MU-MIMO group.

8. The method of claim 7, wherein the one or more signal thresholds are based on historical signal condition information associated with the access node, the historical signal condition information comprising: a historical signal-to-interference-plus-noise ratio (SINR), a historical throughput of the at least two wireless devices located within the geographic sector, or a historical MU-MIMO gain.

9. The method of claim 8, wherein:
the historical signal condition information is associated with a geographic sector deployed by the access node, and
the at least two wireless devices are located within the geographic sector.

10. The method of claim 7, further comprising:
determining that the one or more signal thresholds are not met; and
allowing the at least two wireless devices to participate in the first MU-MIMO group.

11. The method of claim 7, wherein the one or more signal thresholds are based on current signal condition information including one or more of a current signal-to-interference-plus-noise ratio (SINR), a current modulation and coding scheme (MCS), or a current latency.

12. The method of claim 11, further comprising determining that a first current signal condition of a first wireless device differs from a second current signal condition of a second wireless device by a difference threshold, prior to preventing the at least two wireless devices from participating in the first MU-MIMO group.

13. A method for preventing multi-user multiple-input multiple-output (MU-MIMO) in a wireless communication network, the method comprising:
monitoring a throughput a geographic sector deployed by an access node that deploys multiple geographic sectors;
determining that the throughput of the geographic sector deployed by the access node comprising multiple geographic sectors is below a first predetermined throughput threshold based on historical throughput of the geographic sector, wherein the geographic sector comprises two or more wireless devices located within the geographic sector among the deployed multiple geographic sectors;
determining that one or more signal conditions within the geographic sector meet a signal threshold; and
responsive to determining that the throughput is below the first predetermined throughput threshold and the signal conditions meet the signal threshold, disabling a MU-MIMO operating mode for wireless devices within the geographic sector.

14. The method of claim 13, wherein disabling the MU-MIMO operating mode for wireless devices within the geographic sector comprises preventing the access node from forming new MU-MIMO groups within the geographic sector.

15. The method of claim 13, wherein disabling the MU-MIMO operating mode for wireless devices within the geographic sector comprises preventing the wireless devices within the geographic sector from joining existing MU-MIMO groups.

16. The method of claim 13, further comprising:
subsequently determining that the throughput meets or exceeds the first predetermined throughput threshold; and
continuing to disable the MU-MIMO operating mode responsive to determining that the signal conditions continue to meet the signal threshold.

17. The method of claim 13, further comprising:
subsequently determining that the throughput meets or exceeds the first predetermined throughput threshold;
determining that the signal conditions do not meet the signal threshold; and
enabling the MU-MIMO operating mode.

18. The method of claim 13, wherein the signal conditions comprise one or more of historical signal conditions and current signal conditions.

19. A system for preventing multi-user multiple-input multiple-output (MU-MIMO) in a wireless communication network, the system comprising:
a processing node; and
a processor coupled to the processing node, the processor being configured to:
monitor a throughput of a geographic sector deployed by an access node that deploys multiple geographic sectors;
determine that the throughput of the geographic sector deployed by the access node comprising multiple geographic sectors does not meet a predetermined throughput threshold, wherein the geographic sector comprises two or more wireless devices located within the geographic sector among the deployed multiple geographic sectors;
determine that one or more signal conditions within the geographic sector meet a signal threshold based on historical throughput of the geographic sector; and
responsive to determining that the throughput does not meet the predetermined throughput threshold and that the one or more signal conditions meet the signal threshold, preventing wireless devices in the geographic sector from participating MU-MIMO.

20. The system of claim 19, further comprising: determining that two or more wireless devices qualify for participating in a MU-MIMO group in response to determining that the throughput of the geographic sector meets the predetermined throughput threshold.

* * * * *